E. ISCHINGER.
CHILD'S VEHICLE.
APPLICATION FILED JUNE 26, 1919.
1,343,566.
Patented June 15, 1920.
2 SHEETS—SHEET 1.
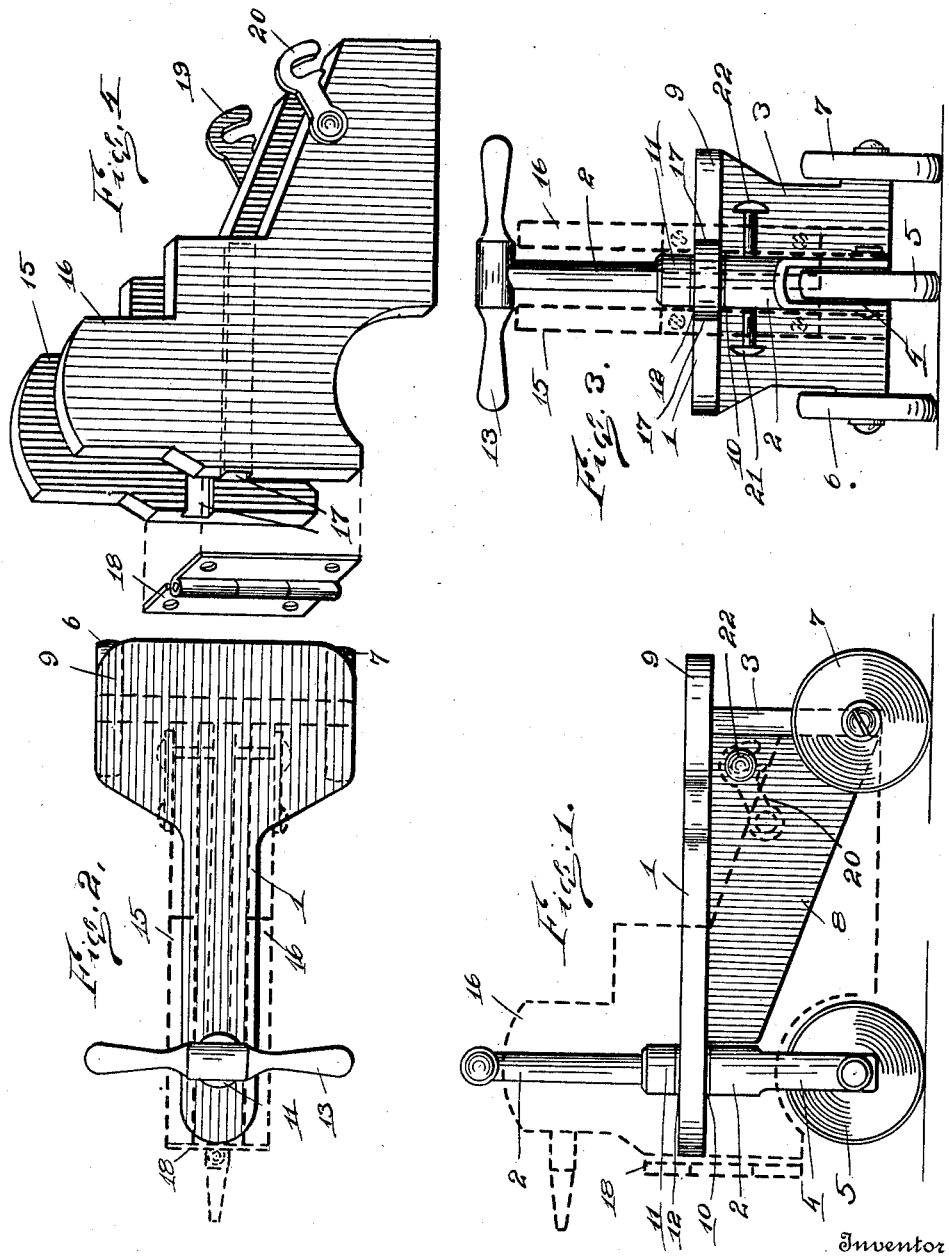
Inventor
Eric Ischinger

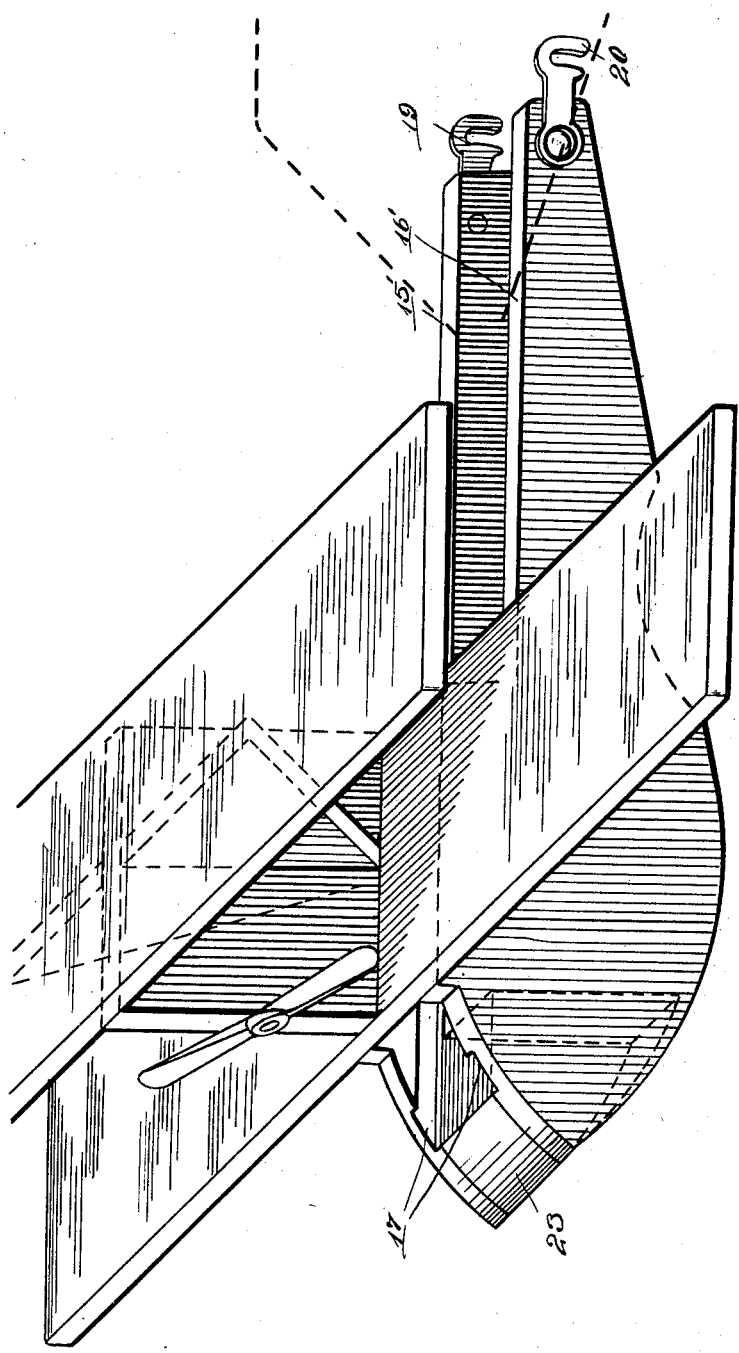

UNITED STATES PATENT OFFICE.

ERIC ISCHINGER, OF ROCHESTER, NEW YORK, ASSIGNOR TO ERNST R. SAALMANN, OF ROCHESTER, NEW YORK.

CHILD'S VEHICLE.

1,343,566.  Specification of Letters Patent.  Patented June 15, 1920.

Application filed June 26, 1919. Serial No. 306,842.

*To all whom it may concern:*

Be it known that I, ERIC ISCHINGER, a citizen of the United States, residing at Rochester, in the county of Monroe and State of New York, have invented certain new and useful Improvements in Children's Vehicles, of which the following is a specification.

The object of this invention is to so construct a child's vehicle that any number of auxiliary body frames may be attached to and interchanged on the original or skeleton frame thereof in order to give the vehicle the appearance of different forms of vehicles or other movable objects.

This and other objects of the invention will be fully illustrated in the drawings, described in the specification and pointed out in the claims at the end thereof.

In the accompanying drawings,

Figure 1 is a side elevation of the skeleton frame of the child's vehicle with an auxiliary body frame representing a "tank" shown in dotted lines in place thereon.

Fig. 2 is a top plan view of the vehicle shown in Fig. 1.

Fig. 3 is a front elevation of the same vehicle.

Fig. 4 is a detail perspective view of the auxiliary body frame representing a "tank."

Fig. 5 is an enlarged detail perspective view of the body and wings of an aeroplane of the flying boat type ready to be attached to the skeleton frame shown in Figs. 1 to 3 inclusive.

In the several figures of the drawings, like reference numerals indicate like parts.

The skeleton frame of the vehicle hereinafter described comprises a horizontal member 1 which is supported near the front by the steering post 2 and at the rear by the axle member 3. The steering post 2 is bifurcated at the lower end to form a fork 4 thereon in which the wheel 5 is mounted to rotate.

The axle member 3 is supported on the wheels 6 and 7 which are mounted to rotate idly on either side thereof. A reinforcing rib 8 is fastened to the under side of the horizontal member 1. This reinforcing rib abuts against one end of the axle member 3 to which it is fastened to form a brace between the axle member 3 and horizontal member 1.

The rear end of the horizontal member 1 is enlarged to form the seat 9 thereon and the front end is perforated to form a bearing for the steering post to rotate therein. The steering post projecting above the horizontal member is reduced in diameter and has a shoulder 10 formed thereon on which the horizontal member is supported. A collar 11 is fastened to the steering post above the horizontal member so as to form a second shoulder 12 on the steering post above the horizontal member 1 between which shoulder and the shoulder 10 the horizontal member 1 is securely held in place thereon. A steering handle 13 is mounted at the top of the steering post by means of which the steering post and in turn the wheel 5 may be turned to steer the vehicle.

In order to change the appearance of the vehicle, the skeleton frame is adapted to have different forms of auxiliary body frames attached thereto. These auxiliary frames, while differing in outlines, are made so that either the whole or part of the frame straddles the horizontal member of the skeleton frame.

The "tank" body, shown in connection with the skeleton frame, is made up of two vertical body members 15 and 16. Each of these body members has the outline of a "tank" as shown. The inner side of each member of the "tank" body has a horizontal channel 17 cut therein and the front end of both members is connected together by the hinge 18.

The "tank" body is attached by folding each of the members thereof against the sides of the skeleton frame. The sides of the horizontal member 1 of this frame are adapted to engage the channels 17 in the "tank" body members in order to line up the "tank" body on the skeleton frame and at the same time hold the "tank" body members in place thereon.

The hinge 18 operates to hold the "tank" body members together at the front while they are being placed against the sides of the skeleton frame as previously described. After the body member is placed parallel to the skeleton frame with the sides of the horizontal member 1 thereof projecting into the channels 17, the latches 19 and 20, provided on the outside of each of the "tank" body members at the rear ends thereof, are hooked over the studs 21 and 22 provided on each side of the reinforcing rib 8.

The latches 19 and 20 thus lock the rear of the body members of the "tank" in place on the skeleton frame. The hinge 18 holds these same members together at the front so that they cannot disengage themselves from the horizontal member of the skeleton frame.

In Fig. 5 I have shown an auxiliary frame representing an aeroplane of the flying boat type. This frame comprises the body members 15' and 16' with the horizontal channels 17 cut therein. Instead of a hinge the front ends of the body members are held together by a spacing block 23 which may be suitably fastened to both of the body members. The seat is part of the skeleton frame and is formed so as to represent the tail or rudder of the plane. The position of the seat is shown in dotted lines at the right of Fig. 5. The latches 19 and 20 are employed to hold the rear ends of the body members in place on the skeleton frame.

While only two forms of bodies are shown in connection with the skeleton frame, it will be understood that with slight modification which requires no inventive ability, any other form of body may be attached thereto. Thus the skeleton frame may be transformed equally well into submarines, battleships, animals, etc., without departing from the scope of this invention.

I claim:

1. In a child's vehicle, the combination of a skeleton frame, wheels supporting said frame, a pair of vertical body members supported on said frame to partially cover and conceal both sides of said skeleton frame, means to fasten said body members together near one end thereof, and means to lock the other ends of said body members to said skeleton frame.

2. In a child's vehicle, the combination of a skeleton frame, wheels supporting said frame, a pair of body members engaging the sides of said skeleton frame, a hinge connecting said body members at one end and means to lock said body members to said skeleton frames at the other ends thereof.

3. In a child's vehicle, the combination of a skeleton frame, wheels supporting said skeleton frame, a pair of body members adapted to be fastened to said skeleton frame, one at each side of said frame to partially cover and conceal both sides of the skeleton frame, means to connect said body members near one end of said skeleton frame and means to individually lock each of said body members to said skeleton frame near the other end thereof.

4. In a child's vehicle, the combination of a skeleton frame, wheels supporting said frame, a horizontal member carried on said frame, a pair of vertical body members, a channel provided on each of said vertical body members, said channel engaging said horizontal member on said frame and supporting said vertical body members on said frame to partially cover and conceal both sides thereof, and means to lock said vertical body members on said frame.

5. In a child's vehicle, the combination of a skeleton frame, wheels supporting said frame, a horizontal member carried on said frame, a pair of vertical body members, a channel provided on each of said vertical body members, said channel engaging said horizontal member on said frame and supporting said vertical body members on said frame, a connecting member connecting said vertical body members in front of said horizontal member, and latches at the rear of said body members to engage said skeleton frame and lock said vertical body members to said skeleton frame.

6. In a child's vehicle the combination of a skeleton frame, a secondary body adapted to extend down over said frame and be supported by said skeleton frame, another secondary body interchangeable with the first secondary body to change the characteristic appearance of said skeleton frame and leave the seat exposed, and means to fasten the secondary bodies to said skeleton frame.

7. In a child's vehicle, the combination of a skeleton frame, a removable body member forming a complement to said skeleton frame and adapted to be supported by said skeleton frame and leave the seat exposed, said body member being formed by a vertical member having a relatively narrow cross section so as to be adapted to be straddled by the rider of the vehicle.

In testimony whereof I affix my signature.

ERIC ISCHINGER.